United States Patent
Schoellhammer et al.

(10) Patent No.: US 10,480,655 B2
(45) Date of Patent: Nov. 19, 2019

(54) INTERMEDIATE PLATE

(71) Applicant: ElringKlinger AG, Dettingen (DE)

(72) Inventors: Jochen Schoellhammer, Dettingen (DE); Thomas Anhorn, Dettingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 15/078,769

(22) Filed: Mar. 23, 2016

(65) Prior Publication Data
US 2016/0273655 A1   Sep. 22, 2016

Related U.S. Application Data

(63) Continuation of application No. PCT/EP2014/069300, filed on Sep. 10, 2014.

(30) Foreign Application Priority Data

Sep. 25, 2013 (DE) .................. 10 2013 219 295

(51) Int. Cl.
| | |
|---|---|
| *F16J 15/08* | (2006.01) |
| *F16J 15/10* | (2006.01) |
| *F16J 15/12* | (2006.01) |
| *F16J 15/06* | (2006.01) |
| *F16H 61/00* | (2006.01) |

(52) U.S. Cl.
CPC ........ *F16J 15/102* (2013.01); *F16H 61/0009* (2013.01); *F16J 15/064* (2013.01); *F16J 15/0818* (2013.01); *F16J 15/122* (2013.01)

(58) Field of Classification Search
CPC .. F16J 15/10; F16J 15/102; F16J 15/12; F16J 15/121; F16J 15/122
See application file for complete search history.

(56) References Cited

U.S. PATENT DOCUMENTS

| | | |
|---|---|---|
| 3,679,218 A | 7/1972 | Farnam |
| 3,930,656 A | 1/1976 | Jelinek |
| 4,449,426 A | 5/1984 | Younger |
| 5,322,299 A | 6/1994 | Terai |
| 5,582,415 A | 12/1996 | Yoshida et al. |

(Continued)

FOREIGN PATENT DOCUMENTS

| | | |
|---|---|---|
| CN | 102251997 A | 11/2011 |
| DE | 197 02 382 A1 | 11/1997 |

(Continued)

*Primary Examiner* — Gilbert Y Lee
(74) *Attorney, Agent, or Firm* — Reinhart Boerner Van Deuren P.C.

(57) ABSTRACT

In order, in the case of an intermediate plate for mounting between housing parts of a fluid-operated control unit, in particular a gear unit, including a central unit that is constructed in the shape of a plate and, on either side of the central unit, a respective sealing system for sealing between the central unit and the housing part opposed thereto, this sealing system including sealing elements which are arranged on the respective side of the central unit and provide sealing around passages, to achieve the best possible seal between the central unit and the respective housing part, it is proposed that the respective sealing system should include as the sealing element at least one layer of an elastomer material that is resilient and is appliable adhesively to stick to the respective housing part.

31 Claims, 5 Drawing Sheets

(56) References Cited

U.S. PATENT DOCUMENTS

| | | |
|---|---|---|
| 5,947,482 A | 9/1999 | Iwata |
| 6,070,882 A | 6/2000 | Abe et al. |
| 6,073,938 A | 6/2000 | Abe et al. |
| 6,478,306 B1 | 11/2002 | Kobayashi et al. |
| 7,878,769 B1 | 2/2011 | Warnke et al. |
| 9,835,246 B2 | 12/2017 | Blersch et al. |
| 2006/0232017 A1 | 10/2006 | Hamada et al. |
| 2007/0262535 A1 | 11/2007 | Imai |
| 2008/0211197 A1 | 9/2008 | Abe et al. |
| 2008/0309027 A1* | 12/2008 | Rogeon ............... F16J 15/122 277/653 |
| 2009/0247343 A1 | 10/2009 | Hart |
| 2009/0302551 A1* | 12/2009 | Salameh ............ F16J 15/0818 277/592 |
| 2011/0054106 A1* | 3/2011 | Sano ....................... C08K 3/04 524/451 |
| 2011/0168930 A1 | 7/2011 | Tomoda et al. |
| 2013/0228984 A1 | 9/2013 | Watanabe |
| 2014/0217678 A1 | 8/2014 | Egloff et al. |
| 2016/0273649 A1 | 9/2016 | Schöllhammer et al. |

FOREIGN PATENT DOCUMENTS

| | | |
|---|---|---|
| DE | 695 09 746 T2 | 9/1999 |
| DE | 10 2007 019 946 A1 | 10/2008 |
| DE | 10 2009 008 019 B3 | 11/2010 |
| DE | 10 2009 031 208 A1 | 1/2011 |
| DE | 10 2010 019 307 A1 | 11/2011 |
| DE | 20 2009 018 646 U1 | 7/2012 |
| DE | 20 2011 103 429 U1 | 9/2012 |
| DE | 10 2012 202 759 A1 | 8/2013 |
| EP | 0 417 494 A2 | 3/1991 |
| EP | 0733833 A1 | 9/1996 |
| EP | 2 072 818 A1 | 6/2009 |
| FR | 2 961 574 A1 | 12/2011 |
| JP | 61-177246 U1 | 11/1986 |
| JP | 62-046054 A | 2/1987 |
| JP | H09-210209 A | 8/1997 |
| JP | 2004-270758 A | 9/2004 |
| JP | 2007-303603 A | 11/2007 |
| WO | WO 2010/072402 A1 | 7/2010 |
| WO | WO 2013/011132 A1 | 1/2013 |

\* cited by examiner

INTERMEDIATE PLATE

CROSS-REFERENCE TO RELATED PATENT APPLICATIONS

This application is a continuation of international application number PCT/EP2014/069300 filed on Sep. 10, 2014.

This patent application claims the benefit of International application No. PCT/EP2014/069300 of Sep. 10, 2014 and German application No. 10 2013 219 295.9 of Sep. 25, 2013, the teachings and disclosure of which are hereby incorporated in their entirety by reference thereto.

BACKGROUND OF THE INVENTION

The invention relates to an intermediate plate for mounting between housing parts of a fluid-operated control unit, in particular a gear unit, including a central unit that is constructed in the shape of a plate and, on either side of the central unit, a respective sealing system for sealing between the central unit and the housing part opposite the latter, this sealing system including sealing elements which are arranged on the respective side of the central unit and provide sealing around passages.

Intermediate plates of this kind are known from the prior art.

In these, the problem arises of achieving the best possible seal between the central unit and the respective housing part that also maintains leak-tightness in the event of any kind of deformation of the housing parts and the central unit, even in the event of the high fluid pressures that are conventionally present in the case of a gear unit.

SUMMARY OF THE INVENTION

This object is achieved according to the invention in the case of an intermediate plate of the type mentioned in the introduction in that the respective sealing system includes as the sealing element at least one layer of an elastomer material that is resilient and is appliable adhesively to stick to the respective housing part.

The advantage of an elastomer material of this kind is not only its resilience, in order to be able to compensate for varying differences in height between the central unit and the respective housing part, but also the adhesive effect, which results in the elastomer material that forms the sealing element sticking to the respective housing part and thus being in a position to compensate for deformations, which in particular run parallel to the planar extent of the intermediate plate, without damaging the layer of elastomer material by friction in the event of deformations of this kind, since as a result of the adhesive sticking of the elastomer material to the respective housing part the elastomer material does not perform any further movement relative to the respective housing part and in this connection is in a position to perform shear movements and thus to compensate for deformations that are directed parallel to the planar extent of the intermediate plate without the housing parts rubbing against the surface, abutting against these in each case, of the layer of elastomer material, and thus in the long term resulting in damage to the elastomer material.

The elastomer material may be constructed in the greatest possible variety of ways.

For example, the elastomer material could include a silicone material.

A particularly favourable solution provides for the elastomer material to include a partly polymerised rubber material.

A partly polymerised rubber material of this kind has for example a degree of polymerisation in the range between 15% or more and 90% or less.

A particularly advantageous form of the polymer material provides for this to include a fluoropolymer rubber.

More detailed statements have not yet been made as regards the thickness of the layer of elastomer material.

For example, an advantageous solution provides for the layer of elastomer material to have a thickness of 5 µm or above, preferably 10 µm or above, more preferably 15 µm or above.

In this connection, the thickness of the layer of elastomer material should not be entirely without restrictions.

For example, an advantageous solution provides for the layer of elastomer material to have a thickness of 100 µm or less, preferably 50 µm or less.

In principle, in the case of a layer formed exclusively from elastomer material, it is sufficient if this layer has a thickness of 30 µm or less.

However, a further element may also be embedded in the elastomer material.

In the case of an element being embedded in the elastomer material, it is advantageously provided for the latter to have a thickness of 50 µm or above and for its thickness to be up to 100 µm or less, wherein a layer of this kind may for example be applied on one side or both sides of the element to be embedded such that the layer is also in a position to compensate for unevenness in the surface of this element.

Furthermore, the elastomer material used according to the invention may favourably be characterised by further parameters.

For example, an advantageous solution provides for the elastomer material to have an adhesive effect which, when the central unit is moved away from the respective housing part, results in a draw-off tension of 0.1 kPa or more, wherein the entire surface over which the central unit and the housing part extend in their region of overlap is taken as the basis for the relevant surface.

As regards the application of the layer of elastomer material, the greatest possible variety of possible constructions are likewise conceivable.

For example, one possible construction provides for the layer of elastomer material to be applied by a screen printing method.

Another advantageous solution provides for the layer of elastomer material to be applied by a roller coating.

In this connection, the layer of elastomer material may be applied to the entire surface of the respective side of the central unit.

Another alternative solution provides for the layer of elastomer material to be applied over part of the respective side of the central unit, as a localised layer.

In conjunction with the exemplary embodiments described hitherto, more detailed statements have not been made as regards the construction of the central unit.

For example, an advantageous solution provides for the central unit to include a central plate.

A central plate of this kind may for example be the sole element of the central unit, such that in this case the central plate carries the sealing elements on its mutually opposite flat sides.

As an alternative or in addition thereto, however, it is also advantageous if the central unit has a function-defining layer.

By means of a function-defining layer of this kind, functions that affect the fluid or act on the fluid and which would otherwise have to be integrated in the housing parts may also be realised in the intermediate plate.

In particular, it is provided in a case of this kind for the function-defining layer to be arranged facing one of the flat sides of the central plate.

Since the central plate conventionally has one or more apertures for the fluid, in this case it is preferably provided for the function-defining layer to have at least one functional region that is associated with at least one aperture in the central plate.

This means that in this case the function-defining layer still provides the possibility of associating a functional region with an aperture in the central plate and thus still utilising this aperture with a defined function.

For example, this may be reaslised in that the at least one functional region is arranged to overlap with the at least one aperture in the central plate, such that the functional region can act on the fluid flowing through the aperture.

For example, in this arrangement it is provided for the at least one functional region to have a throttle opening which can thus be associated with an aperture in the central unit.

Another possibility provides for the at least one functional region to have a screening element that can thus likewise be associated with an aperture in the central plate.

The function-defining layer here may be constructed in the greatest possible variety of ways.

For example, it is conceivable to construct the function-defining layer such that it includes a flat material provided with at least one functional region.

In particular, it is provided in this arrangement for the flat material to be for example a sheet-metal material from which the functional regions may be formed by removing material, for example by punching, boring or cutting.

As a result of this, throttle openings or indeed also screening elements can for example be constructed in the layer.

Another advantageous solution provides for the function-defining layer to include a grille provided with the at least one functional region. A grille of this kind may for example be a grille that is punched or cut out of a flat material, for example sheet-metal material.

Advantageously, however, a grille of this kind may also be a braided or, in the case of synthetic material, an injection moulded grille.

Using a function-defining layer of this kind that is formed by a grille, it is possible to form for example screening elements or indeed throttle elements as functional regions, depending on the sizing of the grille openings.

In the case of using a function-defining layer in conjunction with a central plate, it is preferably provided for there to be arranged, between the function-defining layer and the central plate, a layer of a connecting material that connects the two to one another.

In the case of the solutions described above, of a combination of a central plate and a function-defining layer, it is provided for the function-defining layer to face the respective housing part.

Since a function-defining layer of this kind may also be formed from materials that do not have smooth surfaces, a further advantageous solution provides for the function-defining layer to be arranged between the central plate and a cover plate, such that the function-defining layer itself need not be arranged facing one of the housing parts.

In this case, it is favourable if the function-defining layer is connected to the cover plate and the central plate in tightly sealing manner, such that no leaks can occur in the region of the function-defining layer.

For example, for this purpose it is provided for a layer of a connecting material to be arranged in each case between the central plate and the function-defining layer and between the cover plate and the function-defining layer.

In an advantageous case, the function-defining layer can be embedded in the connecting material.

An embedding of the function-defining layer in the connecting material is particularly advantageous if the function-defining layer has openings through which the connecting material passes.

More detailed statements have not yet been made as regards the construction of the connecting material.

For example, it is in principle sufficient if the connecting material is a material having an adhesive effect.

In order to achieve sufficient leak-tightness, with in particular no leaks arising as a result of brittleness, it is preferably provided for the connecting material to be an elastomer material.

A particularly favourable solution provides for the connecting material to be the same elastomer material as that of the sealing elements.

More detailed statements have not yet been made as regards the relative arrangement of the sealing elements and the central plate.

Thus, an advantageous solution provides for the central plate to carry one of the sealing elements on a first flat side.

In the simplest case, it is further provided for the central plate to carry one of the sealing elements on a second flat side, such that in this case the central unit is formed exclusively by the central plate.

Where a function-defining layer is present, it is favourably provided for this to carry one of the sealing elements on its side remote from the central plate.

In this case, the sealing element may be constructed in a particularly simple manner if the function-defining layer is embedded in the sealing element made from the elastomer material.

Where a cover plate is present, it is moreover favourable if the cover plate carries one of the sealing elements on its side remote from the central unit.

Further features and advantages of the invention form the subject matter of the description below and the illustrative drawing of some exemplary embodiments.

DETAILED DESCRIPTION OF THE INVENTION

Figure 1:
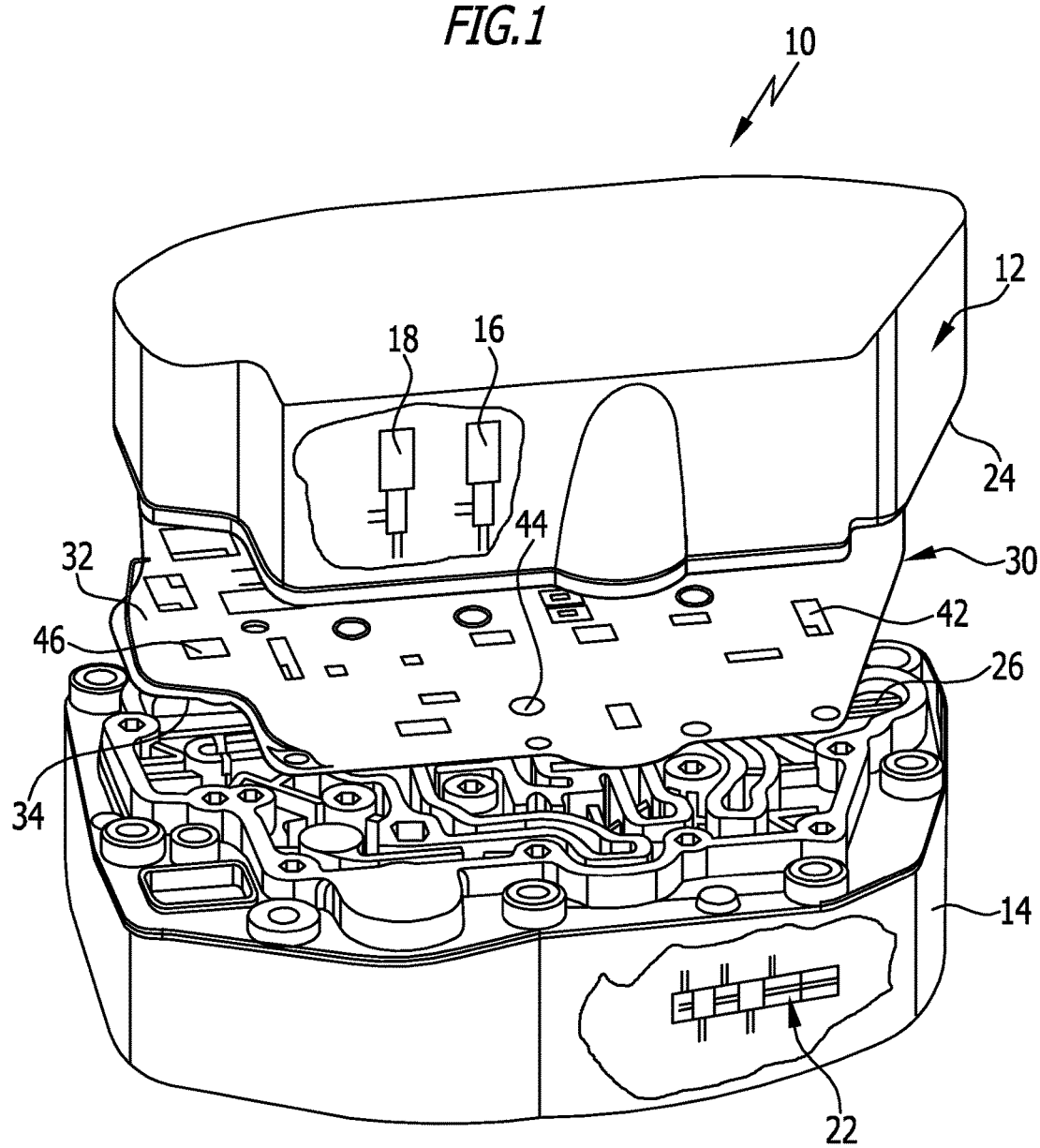
FIG. 1 shows a schematic perspective illustration of a control unit according to the invention, with two housing parts that are demounted and positioned spaced from one another, and an intermediate plate according to the invention lying between the housing parts.

A control unit, which is illustrated schematically in FIG. 1 and is designated 10 as a whole, for fluid-operated consuming units, for example for fluid-operated gear units, in particular gear units for motor vehicles, includes a first housing part 12, in particular made from metal, and a second housing part 14, in particular made from metal, of which for example the first housing part has valves 16, 18 and the second housing part 14 has for example a slide 22, wherein these each control or regulate a flow of fluid in the respective housing part 12, 14.

The two housing parts 12, 14 have mutually facing channel sides 24 and 26 that are constructed such that the fluid can pass from the one housing part 12, 14 into the respectively other housing part 14, 16.

Between these channel sides 24 and 26 of the housing parts 12, 14 there is inserted an intermediate plate, designated 30 as a whole, which abuts against the channel side 24 of the first housing part 12 by means of a first side 32 and against the channel side 26 of the second housing part 14 by means of a second side 34 and in each case closes off the channel sides 24, 26 in sealing manner, wherein passages, for example the passages 42, 44, 46 and possibly also further passages, are provided in the intermediate plate 30, and through these the fluid passes from one housing part 12, 14 into the other housing part 14, 16.

In this arrangement, some of the passages, for example the passages 42 and 46, make it possible for the fluid to pass unhindered from the one housing part 12, 14 into the respectively other housing part 14, 12, and in a supplementary manner some of the passages, for example the passage 44, serve as a functional element for affecting the fluid passing from the one housing part 12, 14 into the other housing part 14, 12, wherein a passage 44 of this kind enables for example a throttling action that is adjustable in targeted manner for the control of sequences, in particular time sequences of switching procedures.

Figure 2:
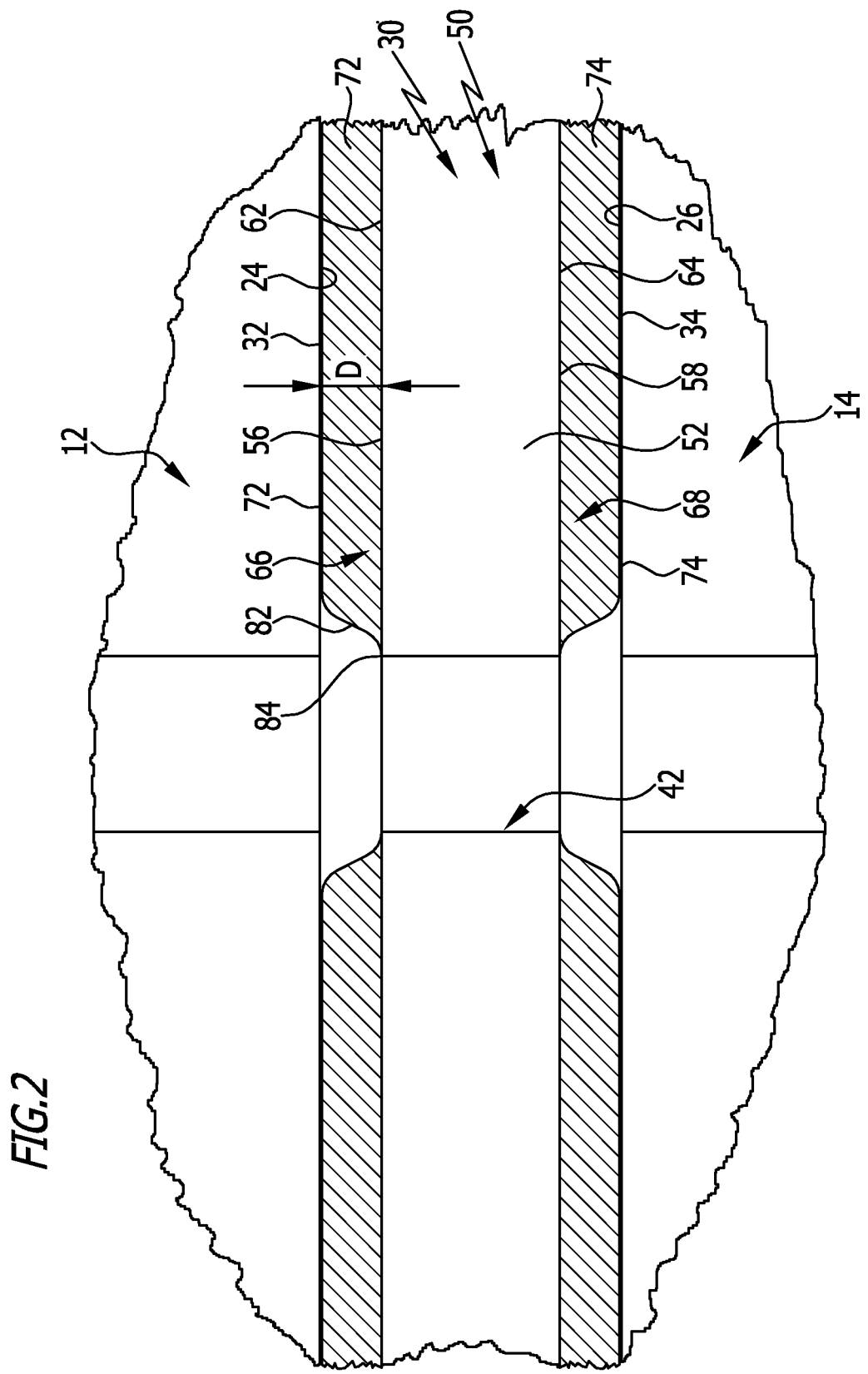
FIG. 2 shows an enlarged section of a detail, through a first exemplary embodiment of an intermediate plate according to the invention, the latter being fixedly mounted between the two housing parts in the region of a passage for a fluid.

In the first exemplary embodiment of the intermediate plate 30 according to the invention, illustrated in FIGS. 1 and 2, the passage 44 is arranged in a central unit 50 which in the first exemplary embodiment includes only a central plate 52.

The central unit 50, in the first exemplary embodiment formed by the central plate 52, further carries on its mutually opposite sides 56 and 58, which coincide with flat sides 62, 64 of the central plate 52, sealing elements 66 and 68 which are each applied for example in the form of at least one layer 72, 74 of elastomer material to the sides 56 and 58, for example by a roller coating, in order to obtain a permanent and reliable seal in respect of the channel sides 24, 26 of the housing parts 12, 14.

In this arrangement, in the assembled condition of the housing parts 12 and 14, as illustrated in FIG. 2, the channel sides 24 and 26 each abut against these facing surfaces 76, 78 of the sealing elements 66 and 68 respectively, such that a sealed closure in respect of these sealing elements 22, 24 is constructible around each of the passages 42, 44, 46 and where appropriate other passages of this kind.

The elastomer material provided in the layers 72, 74 is on the one hand pressure-resistant and on the other resilient, and is moreover constructed such that it is appliable adhesively to stick to the channel sides 24, 26 of the housing parts 12, 14.

In this arrangement, the elastomer material has an adhesive effect which, on moving the central unit 50 away from the respective housing part 12, 14, results in a draw-off tension of 0.1 kPa or more, wherein the entire surface over which the central unit 50 and the housing part 12, 14 extend in their region of overlap is taken as the basis for the relevant surface, such that the entire surface also includes the planar extent of the apertures.

In particular, this may be achieved by an elastomer material that is partly polymerised, wherein in particular rubber material is used.

In this context, favourably the degree of polymerisation of the partly polymerised rubber material is in the range between 15% or more and 90% or less.

Application of the layers 72, 74 is performed for example by a roller coating, wherein in the first exemplary embodiment the layers 72, 74 have a layer thickness D in the range from 50 μpm or more to 100 μm or less, preferably in the first exemplary embodiment in the range from 15 μm or more to 25 μm or less.

The layers 72, 74 may either be applied to the flat sides 56, 58 in locally delimited manner, for example surrounding the passages 42, 44, 46.

Another advantageous solution provides for the layers 72, 74 to be applied over the entire surface of the flat sides 56, 58.

In all cases, the layers 72, 74 run with their layer edges 82 at most at a spacing of 2 mm and an edge 84 of the respective aperture 42, 44, 46 in order to achieve sealing for the pressurised medium as close as possible to the edge of the aperture.

Figure 3:
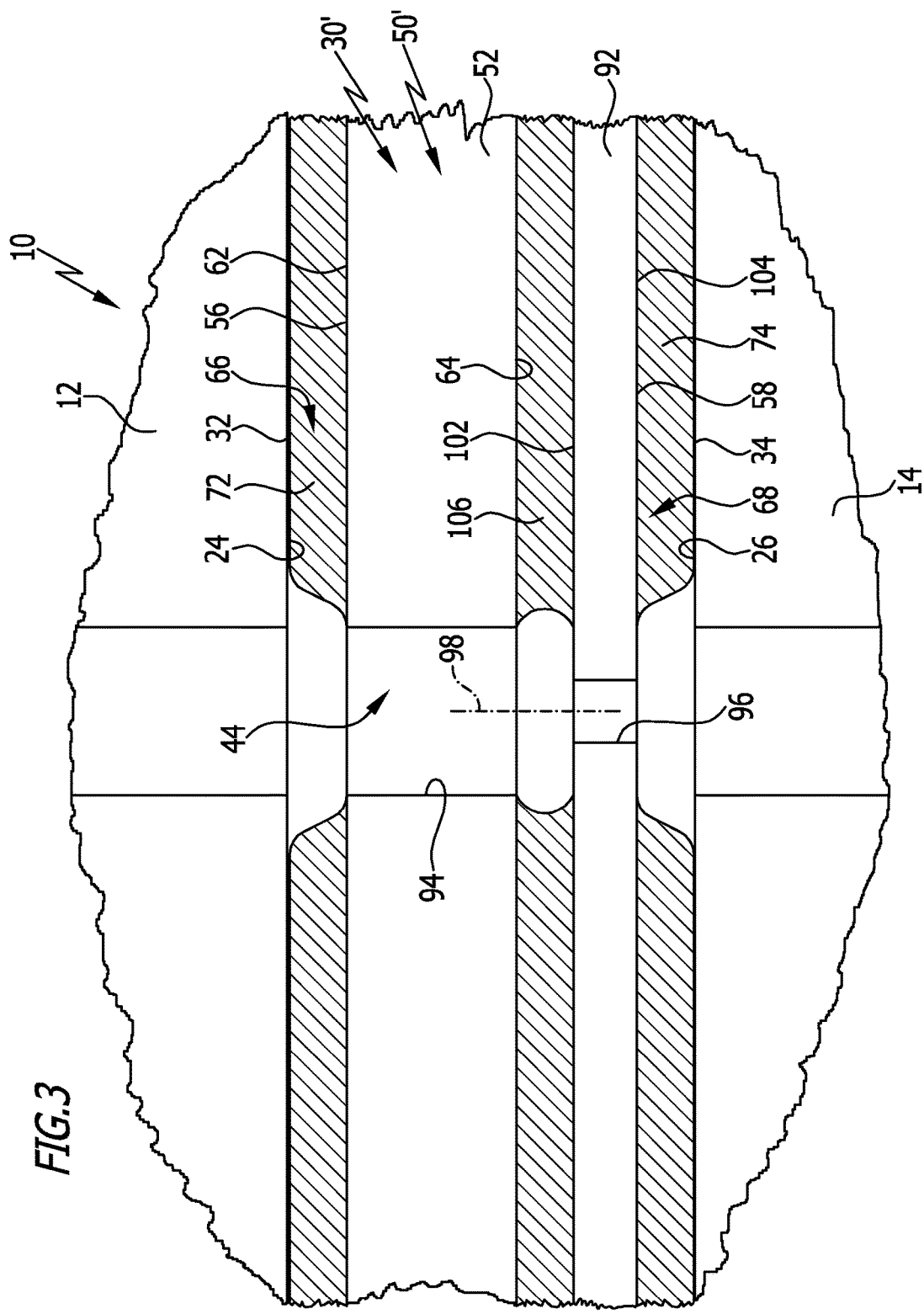
FIG. 3 shows a section similar to FIG. 2, in the case of a second exemplary embodiment of an intermediate plate according to the invention.

In a second exemplary embodiment of the intermediate plate 30 according to the invention, illustrated in FIG. 3, the central unit 50 includes not only the central plate 52 but in addition a function-defining layer 92 which has a throttle opening 96 that is arranged to overlap with an aperture 94 in the central plate 52, wherein the throttle opening 96 is preferably arranged coaxially with respect to a centre axis 98 of the aperture 94.

Thus, the aperture 94 in the central plate 52 has no direct effect on the flow of the pressurised medium, this effect being performed solely by the throttle opening 96 in the function-defining layer 92.

In this context, the function-defining layer 92 is arranged for example facing the flat side 64 of the central plate 52, wherein the function-defining layer 92 extends for example over the entire surface of the central plate 52 and either has a functional element, such as the throttle opening 96, that is associated with one of the passages 42, 44, 46, or indeed has an aperture that corresponds approximately to the corresponding aperture 94 in the central plate 52, such that this aperture does not does not represent a functional element, in the sense of affecting the function of the pressurised medium.

The function-defining layer 92, for its part, has two flat sides 102, 104, wherein the flat side 102 is associated with the flat side 64 and the flat side 104 forms the side 58 of the central unit 50.

For the sealing closure between the central plate 52 and the function-defining layer 92, there is likewise provided, for example between the flat side 102 and the flat side 64, a layer 106 of elastomer material, wherein in the simplest case the layer 106 is identical to the layers 72 and 74, such that the layer 106 is on the one hand resilient and on the other adhesive, and represents a connection with both the central plate 52 and the function-defining layer 92, and hence connects them to one another.

The function-defining layer 92 may be constructed in the greatest possible variety of ways.

For example, in the second exemplary embodiment, the function-defining layer is constructed as a continuous piece of punched flat material, for example a thin metal sheet, wherein either function-defining throttle openings 96 or function-defining screening structures or non-functional apertures for the pressurised medium or for other media may be made by punching.

For example, it is also possible to provide additional apertures which have no relevance to flow paths for the pressurised medium and which for example make it possible for the elastomer material to pass through the function-defining layer 92 and hence to be able to fix it more easily.

For example, in the second exemplary embodiment, it is possible, by means of an aperture of this kind, to make a connection between the layer 106 of elastomer material and the layer 74 forming the sealing element 86.

Otherwise, in the second exemplary embodiment all the elements that are identical to those of the first exemplary embodiment are provided with the same reference numerals, so reference can be made in full to the statements regarding the first exemplary embodiment in respect of the description thereof and also in particular the description of the elastomer material.

Figure 4:
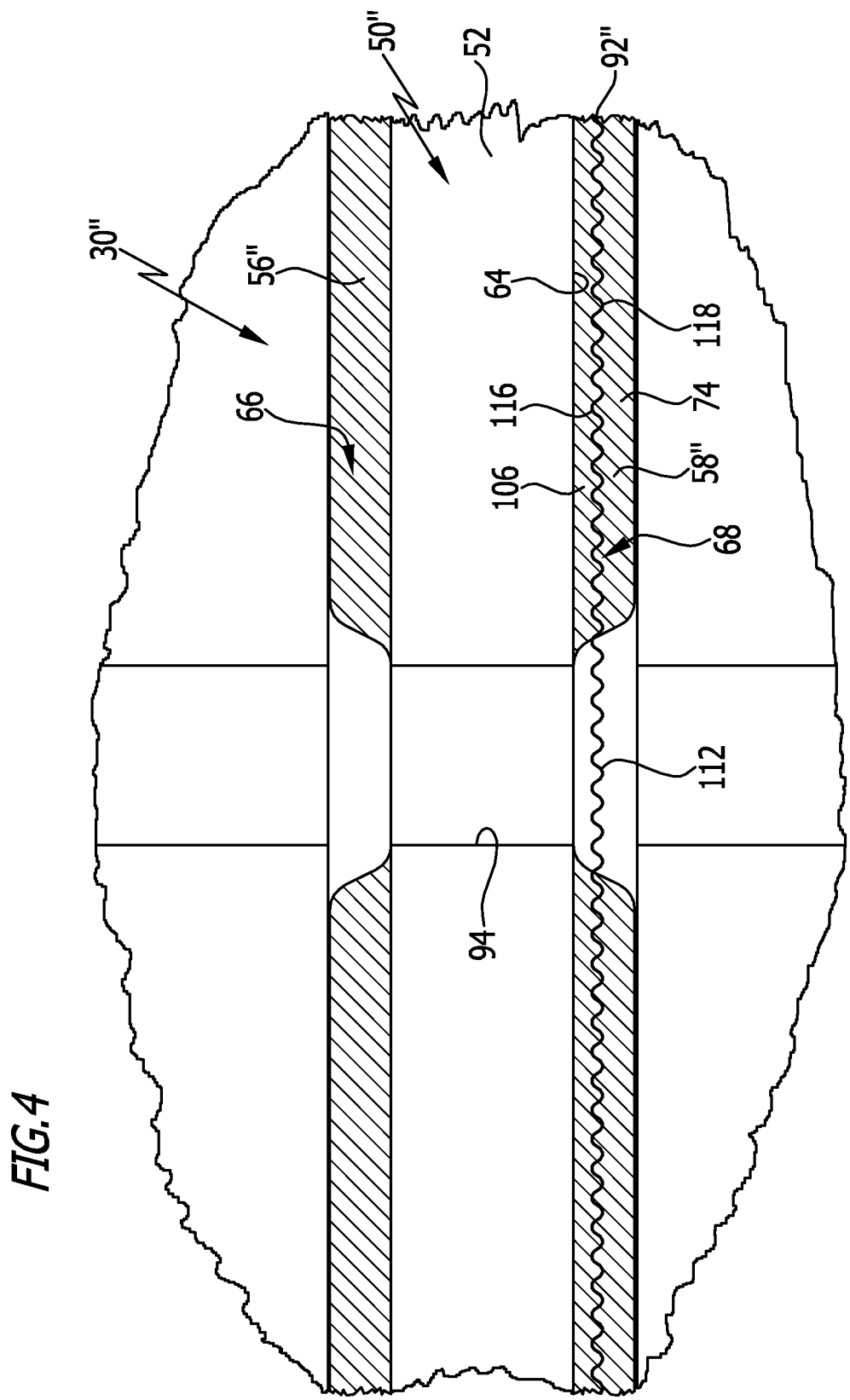
FIG. 4 shows a section similar to FIG. 2, in the case of a third exemplary embodiment of an intermediate plate according to the invention.

In a third exemplary embodiment of an intermediate plate according to the invention, illustrated in FIG. 4, the central unit 50″ includes, in addition to the central plate 52, a function-defining layer 92″, which in this case is made from a fine-mesh grille material, in particular a wire grille material, and which likewise extends for example over the entire flat side 64 of the central plate 52.

In this arrangement, in the region of the through aperture 94 in the central plate 52, the function-defining layer 92″ forms screening elements 112 that overlap the latter and make it possible for example to collect particles from the flow of pressurised medium and where appropriate, with an appropriate mesh width, also to limit a volumetric through flow of the pressurised medium.

In this case, in the third exemplary embodiment too the function-defining layer 92″ is fixed to the central plate 52 by the layer 106 of elastomer material, which lies between the flat side 64 of the central plate and a screen surface 116 facing the flat side 64.

Because of the openings in the function-defining layer 92″, which is constructed as a grille, the elastomer material of the layer 106 can pass through the function-defining layer 92″ to the outside of the screening elements 112 and thus be connected to the elastomer material of the layer 74, which forms the sealing element 68 that is applied to the side 58″, formed by a grille surface 118 opposite the grille surface 116, in order to form the sealing element 68.

Thus, in the regions on the outside of the screening elements 112, the grille that forms the function-defining layer 92″ is embedded in the elastomer material over substantially its entire surface, to form the layers 106 and 74.

Otherwise, in the third exemplary embodiment the same elements are provided with the same reference numerals, so reference can be made in full to the statements regarding the first and second exemplary embodiments in respect of the description thereof and in particular of the layers of elastomer material.

Figure 5:
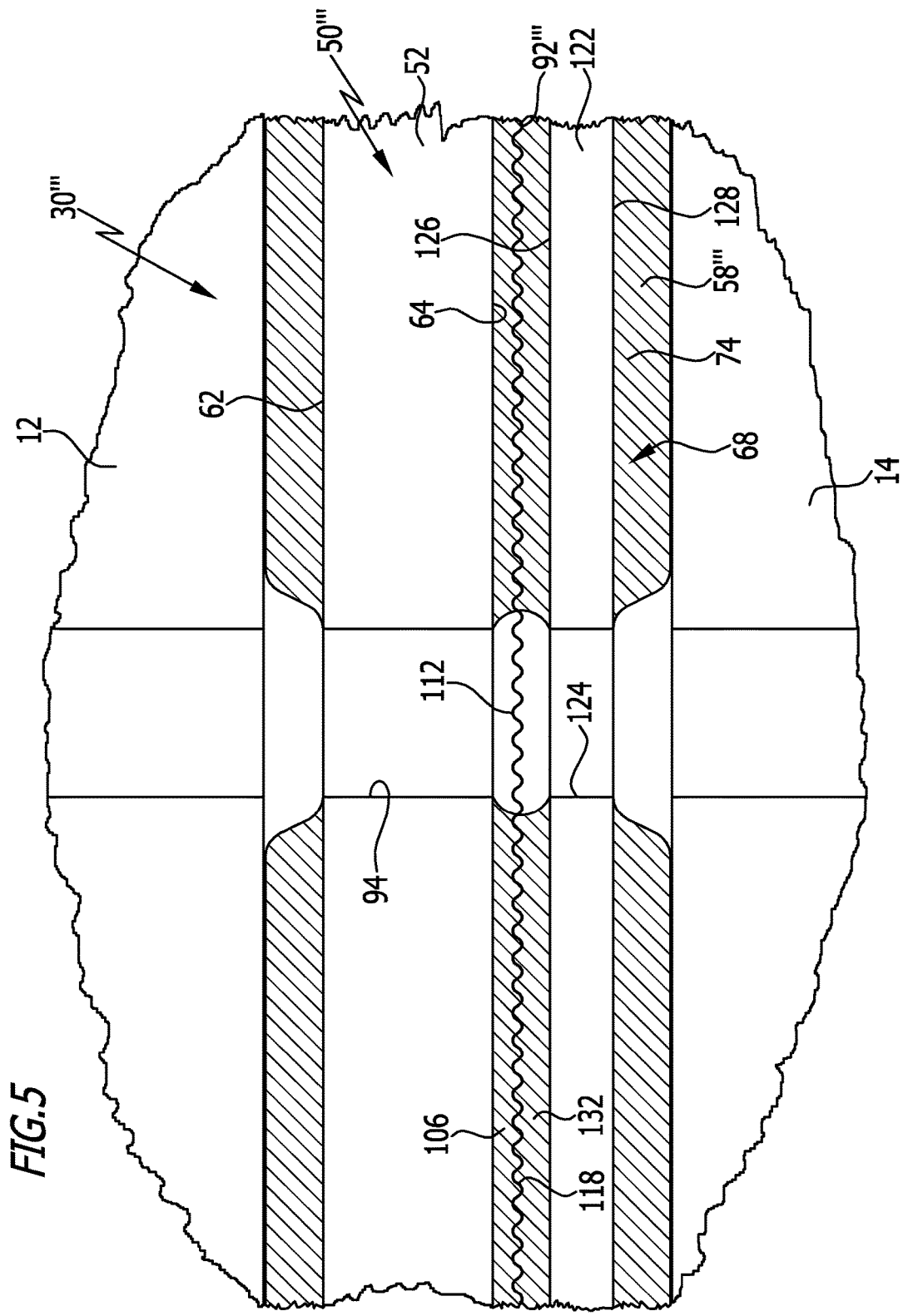
FIG. 5 shows a section similar to FIG. 2, in the case of a fourth exemplary embodiment of an intermediate plate according to the invention.

In a fourth exemplary embodiment of the intermediate plate 30″ according to the invention, illustrated in FIG. 5, the central unit 50‴ includes the central plate 52, a function-defining layer 92″ that is arranged facing the flat side 64 of the central plate 52 and may for example likewise be constructed as a grille and thus be identical to the function-defining layer 92″, and a cover plate 122 that is arranged on an opposite side of the function-defining layer 92″ to the central plate 52, such that the function-defining layer 92″ is arranged between the central plate 52 and the cover plate 122 and is fixed between them.

In this arrangement, the cover plate 122 is provided with a flat side 126 that faces the function-defining layer 92‴, and with an opposite flat side 128 that forms the side 58″40 of the central unit 50‴, on which the layer 74 of elastomer material for forming the sealing element 68 is arranged.

The cover plate 122 is in this case provided with an aperture 124 that is arranged flush with the aperture 94 in the central plate 52, and between these apertures 94, 124 there is arranged the screening element 112 formed by the function-defining layer 92‴, in the flow path of the fluid flowing through the apertures 94 and 124.

For fixing the function-defining layer 92″ between the cover plate 122 and the central plate 52, on one side there is provided the layer 106 of elastomer material, provided between the flat side 64 and the grille surface 116, and a layer 132 is provided between the grille surface 118 and the flat side 126 of the cover plate 122, wherein the elastomer material of the layers 106 and 152 likewise passes through the grille material of the function-defining layer 92″ in the region of its openings, such that overall the grille that forms the function-defining layer 92″ is embedded between the layers 106 and 132, which are connected to one another.

Otherwise, the further elements in the third exemplary embodiment that are identical to those of the preceding exemplary embodiments are likewise provided with the same reference numerals, so reference can be made in full to the statements regarding the preceding exemplary embodiments in respect of the description thereof.

The invention claimed is:

1. An intermediate plate for mounting between housing parts of a fluid-operated control unit, the intermediate plate including a central unit that is constructed in the shape of a plate and, on either side of the central unit, a respective sealing system for sealing between the central unit and the housing part opposed thereto, the sealing system having sealing elements which are arranged on the respective side of the central unit and provide sealing around passages, provided in the intermediate plate;
   wherein the sealing element comprises an adhesive and resilient elastomer material; and
   wherein the elastomer material has an adhesive effect which, when the central unit is moved away from the respective housing part, results in a draw-off tension of 0.1 kPa or more.

2. The intermediate plate of claim 1, wherein the elastomer material includes a partly polymerised rubber material.

3. The intermediate plate of claim 2, wherein the rubber material has a degree of polymerisation in the range between 15% or more and 90% or less.

4. The intermediate plate of claim 1, wherein the elastomer material includes a fluoropolymer rubber.

5. The intermediate plate of claim 1, wherein a layer of the elastomer material has a thickness of 5 µm or above.

6. The intermediate plate of claim 1, wherein the layer of elastomer material has a thickness of 100 µm or less.

7. The intermediate plate of claim 1, wherein the layer of elastomer material is applied by a roller coating.

8. The intermediate plate of claim 1, wherein the layer of elastomer material is applied to the entire surface of the respective side of the central unit.

9. The intermediate plate of claim 1, wherein the layer of elastomer material is applied over part of the respective side of the central unit, as a localised layer.

10. The intermediate plate of to claim 1, wherein the central unit includes a central plate.

11. The intermediate plate of claim 1, wherein the central plate carries one of the sealing elements on a first flat side.

12. The intermediate plate of claim 11, wherein the central plate carries one of the sealing elements on a second flat side.

13. The intermediate plate of claim 11, wherein a function-defining layer carries one of the sealing elements on its side remote from the central plate.

14. The intermediate plate of claim 13, wherein the function-defining layer is embedded in the sealing element made from the elastomer material.

15. An intermediate plate for mounting between housing parts of a fluid-operated control unit, the intermediate plate including a central unit that is constructed in the shape of a plate and, on either side of the central unit, a respective sealing system for sealing between the central unit and the housing part opposed thereto wherein the central unit has a function-defining layer and a layer of connecting material between the function-defining layer and a central plate of the central unit, and wherein the sealing system having sealing elements which are arranged on the respective side of the central unit and provide sealing around passages in the intermediate plate;
wherein the sealing element comprises an adhesive and resilient elastomer material; and
wherein the connecting material is a material having an adhesive effect.

16. An intermediate plate according to claim 15, wherein the function-defining layer is arranged facing one of the flat sides of the central plate.

17. An intermediate plate according to claim 15, wherein the function-defining layer has at least one functional region that is associated with at least one aperture in the central plate.

18. An intermediate plate according to claim 17, wherein the at least one functional region is arranged to overlap with the at least one aperture in the central plate.

19. An intermediate plate according to claim 18, wherein the at least one functional region has a throttle opening.

20. An intermediate plate according to claim 18, wherein the at least one functional region has a screening element.

21. An intermediate plate according to claim 15, wherein the function-defining layer includes a flat material provided with at least one functional region.

22. An intermediate plate according to claim 15, wherein the function-defining layer includes a grille provided with at least one functional region.

23. An intermediate plate according to claim 15, wherein the function-defining layer is arranged between the central plate and a cover plate.

24. An intermediate plate according to claim 23, wherein the function-defining layer is connected to the cover plate and the central plate in tightly sealing manner.

25. An intermediate plate according to claim 23, wherein a layer of a connecting material is arranged in each case between the central plate and the function-defining layer and between the cover plate and the function-defining layer.

26. The intermediate plate of claim 23, wherein the cover plate carries one of the sealing elements on its side remote from the central plate.

27. An intermediate plate according to claim 15, wherein the function-defining layer is embedded in a layer of connecting material.

28. An intermediate plate according to claim 27, wherein the function-defining layer has openings through which the connecting material passes.

29. An intermediate plate according to claim 28, wherein the connecting material is an elastomer material.

30. An intermediate plate according to claim 15, wherein the connecting material is the same elastomer material as that of the sealing elements.

31. An intermediate plate for mounting between housing parts of a fluid-operated control unit, the intermediate plate including a central unit that is constructed in the shape of a plate and, on either side of the central unit, a respective sealing system for sealing between the central unit and the housing part opposed thereto wherein the central unit has a function-defining layer and a layer of connecting material between the function-defining layer and a central plate of the central unit, and wherein the sealing system having sealing elements which are arranged on the respective side of the central unit and provide sealing around passages in the intermediate plate;
wherein the sealing element comprises an adhesive and resilient elastomer material, and wherein the elastomer material has an adhesive effect which, when the central unit is moved away from the respective housing part, results in a draw-off tension of 0.1 kPa or more.

* * * * *